United States Patent [19]

Faith et al.

[11] Patent Number: 4,682,346
[45] Date of Patent: Jul. 21, 1987

[54] TELEPHONE TEST SET

[75] Inventors: Richard W. Faith, Oxnard; Thomas W. Durston, Camarillo, both of Calif.

[73] Assignee: Harris Corporation, Melbourne, Fla.

[21] Appl. No.: 813,156

[22] Filed: Dec. 24, 1985

[51] Int. Cl.$^4$ ............................................... H04B 3/46
[52] U.S. Cl. ......................................... 379/22; 379/25
[58] Field of Search ................. 179/175.3 R, 175.3 A, 179/175.25, 175.3 F, 175, 81 R, 81 C; 178/63 R, 69 R; 307/571

[56] References Cited

U.S. PATENT DOCUMENTS 3,852,537 12/1974 Vincent ................... 179/175.3 R X
4,588,862 3/1986 Grabowy .......................... 179/81 C Primary Examiner—Stafford D. Schreyer
Attorney, Agent, or Firm—Antonelli, Terry & Wands

[57] ABSTRACT

An improved telephone test set is disclosed which may be operated with low voltage line conditions. Transmitting and receiving voice communication circuits are connected in parallel with leads which are adapted to be connected to the tip and ring lines of a subscriber's telephone line to isolate the voice transmitting and receiving circuits from the voltage drop of a polarity guarding bridge which is connected to the signalling circuits of the telephone test set. A polarity indicating circuit to indicate the direction of current flow between the tip and ring lines of a subscriber's telephone line is connected in series with the voice transmitting and receiving circuits.

25 Claims, 6 Drawing Figures

TELEPHONE TEST SET

BACKGROUND OF THE INVENTION

1. Field of the Invention

The present invention relates to telephone test sets.

2. Description of the Prior Art

FIG. 1 illustrates a prior art telephone test set which has been manufactured by the assignee of the present invention as the Dracon Model TS 21-080 test set.

A telephone test set is commonly used in two distinct modes of operation. The first mode of operation involves the operation on normal telephone lines which involve the establishment of talking circuits between the test set and the telephone central office which typically have 5 volts or more voltage drop within the test set. The second mode of operation involves the so-called "dry loop" wherein a pair of test sets are connected to the opposite ends of a pair of wires to enable the linepersons to identify the ends of a single pair of wires. This dry loop mode of operation does not receive battery voltage from the central office and functions with the pair of test sets sharing 3 volts or less provided by a small battery minus line losses. There is considerable resistance by the various telephone operating companies to the purchase of test sets which can only operate in a single one of the two modes of operation described, supra.

Prior art telephone test sets which can perform in both of the above-described operating modes typically include a two-position switch which is commonly known as a "keypad-in/out" switch. The switch permits choice between the mode of operation requiring signaling capability and the mode which does not require signaling capability. The prior art test set of FIG. 1 has a three pole two position switch, having contacts S1A, S1B and S1C, used to determine the mode of operation under which the test set operates. In the position labelled "out", the speech network is connected directly to the tip and ring lines. The contact S1C prevents the lineperson from being subjected to loud bursts caused by inadvertent contact with the keypad of the dial pulse switch. The contact S2 is used in its closed position for conducting a polarity test of the tip and ring lines to check the direction of current flow between the tip and ring lines by the activation of the oppositely poled light emitting diodes DS1 or DS2 which respectively emit light of a different color when current flows through each diode to inform the lineperson of the direction of current flow.

With the prior art circuit of FIG. 1 being operated in the "keypad in" mode, it is necessary to connect the speech mute switch in series with the speech network. In this configuration, the mute switch must function regardless of the direction of current passing through the test set and so polarity guard BR is necessary. Unfortunately, the non-linear voltage drop of the polarity guard BR can cause the speech network to become inoperative at extremely low tip to ring voltages which are present when the telephone test set is used for conducting line tests with dry loops which are not powered by a central office battery. Moreover, voltage drops in the dial pulse switch can also severely affect the operation of the speech network in low voltage conditions. Finally, with low voltage conditions aggravated by the series connection of the dial pulse switch, speech mute switch and speech network with the polarity guard bridge, the total voltage drop within the test set is such that the insertion of any additional series connected elements would result in excessive total voltage drop; and so a continuously indicating series connected polarity indicating means is not feasible in this prior art. Thus, the polarity indicating circuit is selectively coupled across the tip and ring lines by the closure of switch S2 to permit only intermittent polarity testing.

The three pole two position switches S1 and S2 are sealed switches which are expensive and difficult to obtain, are a leading cause of test set in the field failures, make the operation of the test set cumbersome to the linepersons and make it necessary for the design of the housing for the test set to have a number of openings where moisture may enter.

U.S. Pat. No. 3,708,634 discloses a telephone test set in which a voice receiver unit is partially coupled across the tip and ring lines. The voice transmitter unit is connected in series with a polarity guarding bridge. A SCR is connected in series with the polarity guarding bridge and the voice transmitting unit. The SCR is biased into conduction by the manual closing of a momentary contact switch which then provides a conduction path for the operation of the voice transmitter unit. The SCR is turned on when the voice transmitter unit and voice receiving unit are operational.

The system disclosed in U.S. Pat. No. 3,708,634 is not well suited for operation on dry loops which have low operating potential because of the fact that the voice transmitting unit is connected in series with the polarity guard bridge.

The use of a thermistor in series with the lead of a telephone test set which is adapted to be connected to the tip or ring lines of a subscriber's telephone line is known to protect the telephone test against high current conditions on the subscriber's telephone line. Moreover, the use of a silicon controlled rectifier as a protective mechanism to a hold circuit in a telephone test set is known.

A telephone test set in accordance with the present invention has advantages which are not achieved by the prior art telephone test sets. The telephone test set of the present invention may be used to activate the voice transmitting and receiving circuits when connected to a dry loop which does not receive operating potential from the central telephone office. The transmitting and receiving voice units are connected directly across the leads which are adapted to be connected to the tip and ring lines which removes the effect of the voltage drop in the polarity guard from influencing the operation of the transmitting and receiving units. The elimination of the voltage drop caused by the polarity guard makes it possible to connect an indicator for the direction of current flow between the tip and ring lines directly in series with the voice transmitting and receiving units to permit a continuous indication of the direction of current flow which is useful to the lineperson.

A telephone test set in accordance with the present invention includes first and second leads which are respectively adapted to be connected to a tip line and a ring line of a subscriber's telephone line; a full wave rectifier for providing a rectified output of an input signal and having a pair of input terminals which are respectively connected to the first lead and the second lead and a pair of output terminals which respectively output a voltage of a first polarity and a second polarity; a shunt circuit coupled between the pair of input terminals of the full wave rectifier which is comprised of a series connection of a transmitter and receiver of voice communications and a switch having an open circuit condition when a control signal of a first magnitude is applied to a control terminal and having a closed circuit condition when the control signal is applied to the control terminal of a second magnitude to permit current to flow within the shunt circuit; a signaling circuit for placing a telephone call over the tip and ring lines, coupled between the pair of bridge rectifier output terminals, for producing signals to place a telephone call over the tip and ring lines to a central office when in an activated state and for not producing signals when in an inactive state and a control circuit responsive to the signaling circuit for producing the control signal having the first magnitude when the signaling circuit for placing a telephone call is in the active state and for producing the control signal of the second magnitude when the signaling circuit for placing a telephone call is in the inactive state.

The shunt circuit may include an indicator for continuously indicating the direction of current flow between the tip and ring lines of the subscriber's line which is connected in series with the transmitter and receiver of voice communications and the switch. The switch may be comprised of a pair of field effect transistors each having connected source located within the path of current flow in the shunt circuit with the gates of each of the field effect transistors coupled to the signaling circuit. The control of the field effect transistors may be made by an optical isolator which is activated by the signaling circuit which causes the field effect transistors to be turned off when the signaling circuit is activated.

The indicator for continuously indicating the direction of current flow between the tip and ring lines comprises a pair of oppositely poled light emitting diodes which respectively emit light of a different color. An audio frequency bypass, which shunts the oppositely poled light emitting diodes, permits audio frequency communications to be coupled to the subscribers' telephone lines without attenuation by the diodes. A resistance is provided, which shunts the oppositely poled light emitting diodes, to permit conduction of current in the shunt circuit when a voltage across the light emitting diodes is insufficient to bias one of the diodes substantially into conduction. A voltage limiter is provided which shunts the pair of light emitting diodes to limit the voltage which is applied to the diodes to a level which will not cause their failure. The voltage limiter may be plurality of serially connected diodes located within a bridge.

The signaling circuits are protected by a voltage limiter to prevent excessive voltages being applied which is comprised of a second shunt circuit coupled between the output terminals which shunts the output terminals of the full wave rectifier and the signaling circuits. The second shunt circuit includes a variable impedance which shunts the output terminals with an impedance which decreases nonlinearly as an applied potential increases in magnitude. Preferably the variable impedance is a metal oxide varistor. Furthermore, a switching circuit is coupled between the output terminals which is biased into conduction by the application of a control signal of a first magnitude to cause the output terminals to be short circuited together and to have an open circuit condition when the control signal is below the first magnitude. The control signal is produced by a RC circuit coupled to the variable impedance and to one of the output terminals. Preferably, the switching circuit is a SCR having an anode and a cathode coupled respectively to the output terminals and a gate coupled to the RC circuit. A voltage limiting circuit may be coupled to the variable impedance and one of the output terminals with the gate of the SCR being coupled to the voltage limiting circuit to protect the gate against excessive voltage.

An indicating circuit within a telephone set for continuously signaling the direction of current flow between the tip and ring lines of a telephone line in which the indicating circuit is connected in series with a transmitter and receiver of voice communications within the test set includes a pair of oppositely poled light emitting diodes for respectively indicating different directions of current flow between the tip and ring lines by emitting light of a different color, the pair of oppositely poled diodes being coupled between one of the lines of the telephone line and the transmitter and receiver of voice communications; an audio frequency bypass which shunts the oppositely poled light emitting diodes to permit audio frequencies to bypass the light emitting diodes; and a resistance which shunts the oppositely poled light emitting diodes to permit conduction of current in the shunt circuit when a voltage across the oppositely poled light emitting diodes is insufficient to bias one of the light emitting diodes substantially into conduction. A voltage limiter may be provided which shunts the pair of light emitting diodes to limit the voltage which is applied to the diodes. Preferably, the voltage limiter is a plurality of series connected diodes which are configured in a bridge.

DESCRIPTION OF THE PREFERRED EMBODIMENT

Figure 1:
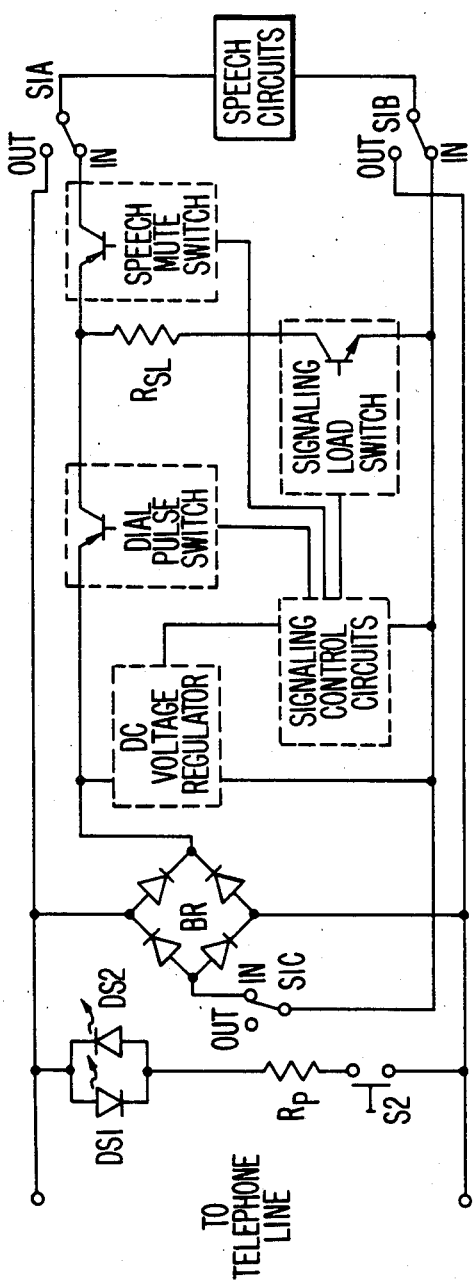
FIG. 1 illustrates a prior art telephone test set.
Figure 2:
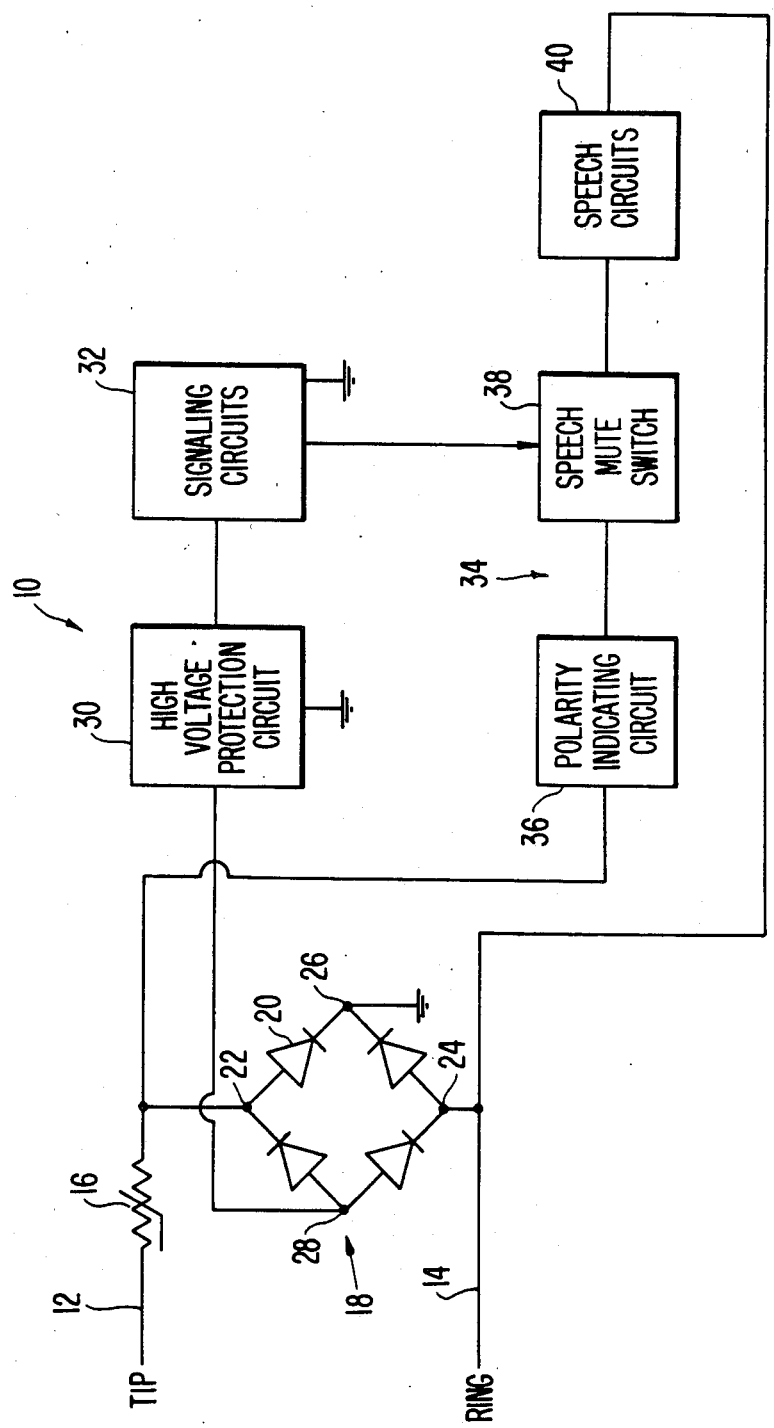
FIG. 2 illustrates a block diagram of a telephone test set in accordance with the present invention.

FIG. 2 illustrates a block diagram of a test set in accordance with the present invention. A telephone test set 10 in accordance with the present invention connects the speech circuits for transmitting and receiving voice communications in a series circuit which is connected to leads which are adapted to be connected to the tip and ring lines of a subscriber's telephone line to remove the speech circuits from being deleteriously influenced by low voltage conditions existing when the subscriber's telephone line extends a long distance from the telephone company's central office or when a pair of telephone test sets are being used at either end of a pair of telephone wires which are not coupled to the telephone central office battery. In these conditions, the presence of a polarity guarding circuit, which is connected across the leads that are adapted to be connected to the tip and ring lines of a subscriber's telephone line for protecting signaling circuits for placing a telephone call to the telephone company central office, does not disable the transmitter and receiver for voice communications as in the prior art of FIG. 1. Furthermore, because the effect of the voltage drop across the polarity guard on the operation of the transmitter and receiver for voice communications has been removed, a polarity indicating circuit may be connected in series with the transmitter and receiver for voice communications to provide a continuous polarity indication without disabling the transmitter and receiver for voice communications because of the voltage drop required to operate the polarity indicating circuit. A speech mute switch is coupled in series with the transmitter and receiver for voice communications which is normally closed, that is automatically opened in response to the lineperson activating the signaling circuits for placing a call over the subscriber's telephone line to the telephone company central office.

FIG. 2 illustrates a block diagram of a telephone test set 10 in accordance with the present invention. A pair of leads 12 and 14, which are respectively labelled "tip" and "ring", are adapted to be coupled to a line pair of a telephone subscriber's telephone line. A thermistor 16 is connected in series with the lead 12 which protects the telephone test set against sustained high current conditions by having a high series resistance. The thermistor functions as a fixed value resistor under normal line current conditions, but when prolonged overcurrent conditions exist, it heats to a temperature wherein the resistance increases positively with increasing temperature. The resistance of the thermistor 16 increases rapidly to a thermal equilibrium producing a high resistance when a sustained overcurrent condition exists. A rectifying bridge 18 having four diodes 20 has a first input terminal 22 connected to line 12 and a second input terminal 24 to line 14. A first output terminal 26 is coupled to ground. A second output terminal 28 is coupled to a high voltage protection circuit 30. The preferred form of the high voltage protection circuit 30 is discussed, infra, with regard to FIG. 5. The high voltage protection circuit 30 is coupled to the signaling circuits 32 of conventional design which produce signals for making a call over the leads 12 and 14 through a subscriber's line to a central telephone office. The signaling circuits will produce DTMF tones or loop disconnect pulses for placing a call. The input terminals 22 and 24 are coupled to a shunt circuit 34 which is comprised of a series combination of a polarity indicating circuit 36, which is described in detail, infra, in conjunction with FIG. 4, a speech mute switch 38, which is described in detail, infra, in conjunction with FIG. 3, and speech circuits 40 which are comprised of a conventional transmitting and receiving unit. With the configuration illustrated in FIG. 2, the speech circuits 40 are not rendered inoperative by low voltage line conditions as a consequence of a voltage drop across the rectifying bridge 18 as with the prior art in FIG. 1. Moreover, the polarity indicating circuit 36 may be connected in series with the speech circuits to produce a continuous indication of the direction of current flow between the tip and ring lines as a consequence of the speech circuits not being rendered inoperative by the voltage drop across the full wave rectifying bridge 18 as with the prior art of FIG. 1 during low voltage conditions.

Figure 3:
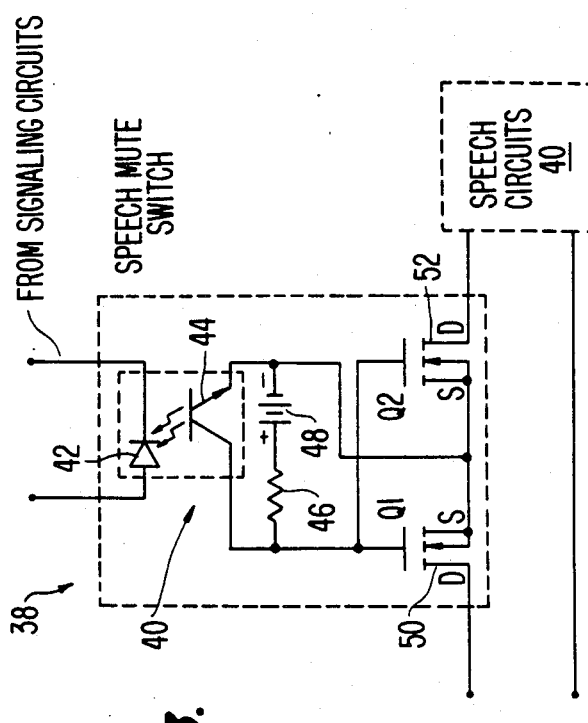
FIG. 3 is a circuit schematic of the switching circuit of FIG. 2.

FIG. 3 illustrates the preferred form of speech mute switch 38 in accordance with the present invention. An optical isolator 40 having a light emitting diode 42, which is activated by the operation of the signaling circuits 32, is optically coupled to a phototransistor 44.

The phototransistor 44 shunts a series combination of a resistor 46 and a battery 48. A series combination of two field effect transistors 50 and 52, with their sources coupled together, functions as a high impedance when the signaling circuits 32 are in the active state and as a low impedance when the signaling circuits are in the inactive state. The activation of the field effect transistors 50 and 52 into the low impedance condition is produced when the signaling circuits are inactive which provides the shunt circuit 34 with a path for coupling the received and transmitted voice communications directly with the lines 12 and 14. The resistance 46 provides a high impedance which limits the current drawn by the phototransistor 44 when it is conductive. The connection of the sources together of the field effect transistors 50 and 52 provides a extremely high impedance against the application of signals of either polarity to the leads 12 and 14.

Figure 4:
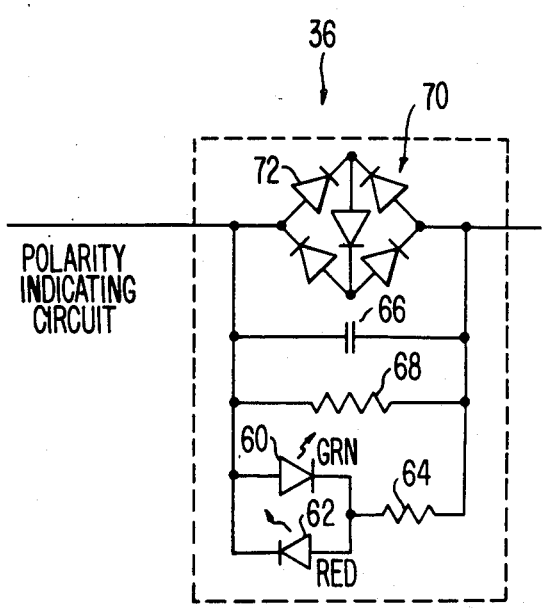
FIG. 4 is a circuit schematic of the polarity indicating circuit of FIG. 2.

FIG. 4 illustrates the preferred embodiment of the polarity indicating circuit 36 of FIG. 2. The polarity indicating circuit 36 has a pair of oppositely poled light emitting diodes 60 and 62, which respectively emit green and red light continuously, to signal the direction of current flow between the leads 12 and 14 when forward biased. A resistance 64 is coupled in series with the oppositely poled parallel combination of light emitting diodes 60 and 62. The resistance 64 limits the amount of current which may be drawn by the light emitting diodes. A capacitance 66 shunts the oppositely poled light emitting diodes 60 and 62 to provide an audio frequency bypass of low impedance for communications transmitted and received by the speech circuits 40. A resistance 68 shunts the oppositely poled light emitting diodes 60 and 62 which permits the speech circuits 40 to continue to operate even when the line potential is too low to support substantial conduction of either the light emitting diode 60 or 62. A voltage limiter 70, which is comprised of a plurality of diodes 72 connected in series in a bridge, limits the amount of voltage which can be applied to the diodes 60 and 62.

Figure 5:
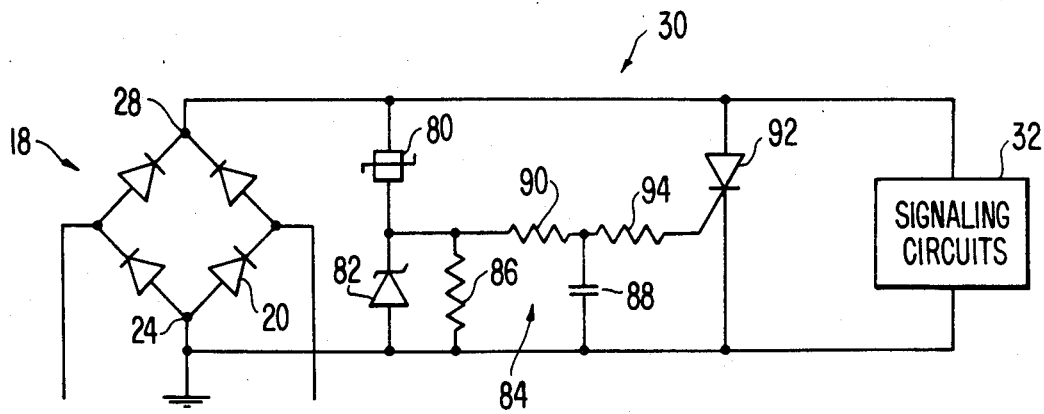
FIG. 5 is a circuit schematic of the high voltage protection circuit of FIG. 2.

FIG. 5 illustrates the high voltage protection circuit 30 of FIG. 2. Metal oxide varistor 80 is connected between terminal 28 and the cathode of a Zener diode 82 having an anode connected to terminal 24. The function of the metal oxide varistor is to provide a nonlinear resistance characteristic which rapidly decreases with an increase in applied potential to limit the voltage drop applied across the terminals 26 and 28 to safeguard the signaling circuits 32 and circuits within the shunt circuit 34. An RC circuit 84 consisting of a resistor 86, capacitor 88 and resistor 90 is connected between the cathode of Zener diode 82 and the gate of the voltage limiting SCR 92. The RC circuit 84 has a time constant which integrates the voltage applied across resistor 86 by conduction of the metal oxide varistor 80 to cause a short circuit between the terminals 26 and 28 when the high voltage condition has existed for a time sufficient to bias the gate of the SCR 92 sufficiently to turn the SCR on. Once the SCR 92 is turned on, the potential applied to the signaling circuits 32 and to the shunt circuit 34 is limited to the forward drop across the SCR. When the terminal 28 is effectively grounded by conduction of SCR 92, the input terminals 22 and 24, which are respectively coupled to the tip and ring lines, appear virtually shorted together (two diode drops) which limits the potential applied to shunt circuit 34 to a safe level. Resistance 94 is connected between the RC circuit 84 and the gate of the SCR 92, to isolate the gate of SCR 92 from the transient loading effect of capacitor 88.

Figure 6:
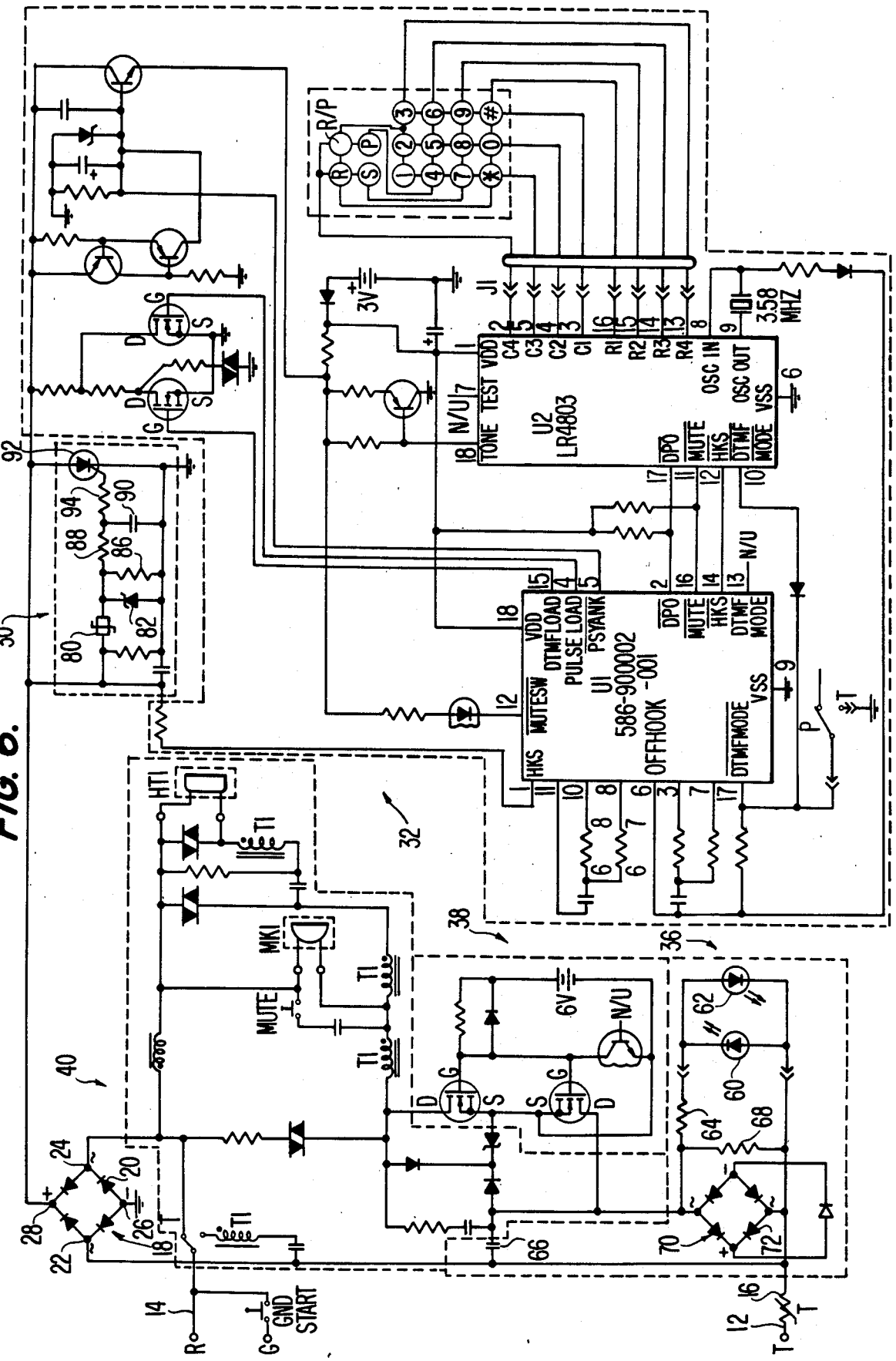
FIG. 6 illustrates an electrical schematic of the preferred embodiment of a test set in accordance with the present invention.

FIG. 6 illustrates a preferred embodiment of a telephone test set in accordance with the present invention. Identical parts are identified with the same reference numerals as in the preceding figures. Semiconductor chips are identified by their manufacturer's part number.

While the invention has been described in terms of its preferred embodiment, it should be understood that numerous modifications may be made thereto without departing from the spirit and scope of the invention as defined in the appended claims. It is intended that all such modifications fall within the scope of the appended claims.

We claim:

1. A telephone test set comprising:
    (a) a first lead and a second lead which are respectively adapted to be connected to a tip line and a ring line of a telephone line;
    (b) a full wave rectifying means for providing a rectified output of an input signal and having a pair of input terminals which are respectively connected to the first lead and the second lead and a pair of output terminals which respectively output a voltage of a first polarity and a second polarity;
    (c) a shunt circuit coupled between the pair of input terminals of the full wave rectifying means which is comprised of a series connection of a means for transmitting and receiving voice communications and a switching means having an open circuit condition when a control signal of a first magnitude is applied to a control terminal and having a closed circuit condition when the control signal of a second magnitude is applied to the control terminal to permit current to flow within the shunt circuit;
    (d) a signaling means coupled between the pair of output terminals for producing signals to place a telephone call over the tip and ring lines to a central office when in an activated state and for not producing signals when in an inactive state, and
    (e) control means responsive to the signaling means for producing the control signal having the first magnitude when the signaling means for placing a telephone call is in the active state and having the second magnitude when the signaling means for placing a telephone call is in the inactive state.

2. A telephone test set in accordance with claim 1 wherein the shunt circuit further comprises means for continuously indicating the direction of current flow between the tip and ring lines of the telephone line which is connected in series with the means for transmitting and receiving voice communications and the switching means.

3. A telephone test set in accordance with claim 2 further comprising means, coupled between output terminals of the full wave rectifying means and the signaling means for placing a telephone call, for protecting the signaling means for placing a call and the shunt circuit against the application of high voltages which would damage the signaling means for placing a telephone call or the shunt circuit.

4. A telephone test set in accordance with claim 2 wherein the switching means comprises a pair of field effect transistors having source electrodes connected together and located within the path of current flow in the shunt circuit with the gates of each field effect transistor coupled to the control means.

5. A telephone test set in accordance with claim 4 further comprising:
    (a) an optical isolator having a light emitting device which is caused to emit light when the signaling means for placing a telephone call is activated; and
    (b) a switching means which is biased into conduction when the light emitting device is activated, the switching means being coupled to the gates of the field effect transistors to cause the field effect transistors to turn off when the switching means is turned on.

6. A telephone test set in accordance with claim 5 further comprising:
    (a) a battery having terminals with respectively first and second polarities;
    (b) a resistance coupled between one of the terminals and the gates of the field effect transistors; and wherein
    (c) the switching means is a phototransistor with the emitter and collector electrodes coupled to series with the resistance and the battery and the light emitting device is a light emitting diode.

7. A telephone test set in accordance with claim 2 wherein the means for continuously indicating the direction of current flow between the tip and ring lines comprises:
    a pair of oppositely poled light emitting diodes which respectively emit light of a different color when forward biased.

8. A telephone test set in accordance with claim 7 wherein the means for continuously indicating the direction of current flow between the tip and ring lines further comprises:
    an audio frequency bypass means which shunts the oppositely poled light emitting diodes to permit audio frequencies to bypass the light emitting diodes.

9. A telephone test set in accordance with claim 7 wherein the means for continuously indicating the direction of current flow between the tip and ring lines further comprises:
    a resistance which shunts the oppositely poled light emitting diodes to permit conduction of current in the shunt circuit when a voltage across the light emitting diodes is insufficient to bias one of the diodes substantially into conduction.

10. A telephone test set in accordance with claim 7 wherein the means for continuously indicating the direction of current flow between the tip and ring lines further comprises:
    (a) an audio frequency bypass means which shunts the oppositely poled light emitting diodes to permit audio frequencies to bypass the light emitting diodes; and
    (b) a resistance which shunts the oppositely poled light emitting diodes to permit conduction of current in the shunt circuit when a voltage across the light emitting diodes is insufficient to bias on of the diodes substantially into conduction.

11. A telephone test set in accordance with claim 7 wherein the means for continuously indicating the direction of current flow between the tip and ring lines further comprises:
    a voltage limiting means which shunts the pair of light emitting diodes to limit the voltage which is applied to the diodes.

12. A telephone test set in accordance with claim 11 wherein the voltage limiting means is comprised of a plurality of diodes connected in series.

13. A telephone test set in accordance with claim 10 wherein the means for continuously indicating the direction of current flow between the tip and ring lines further comprises:
a voltage limiting means which shunts the pair of light emitting diodes to limit the voltage which is applied to the diodes.

14. A telephone test set in accordance with claim 13 wherein the voltage limiting means is comprised of a plurality of diodes connected in series.

15. A telephone test set in accordance with claim 3 wherein the means to protect the signaling means for placing a telephone call against the application of voltages which would damage the signaling means for placing a call comprises:
a second shunt circuit coupled between the output terminals which shunts the output terminals and the signaling means for placing a telephone call.

16. A telephone test set in accordance with claim 15 wherein the second shunt circuit comprises a variable impedance which shunts the output terminals with an impedance that decreases nonlinearly as an applied potential increases in magnitude.

17. A telephone test set in accordance with claim 16 wherein the variable impedance comprises a metal oxide varistor.

18. A telephone test set in accordance with claim 16 further comprising a switching means coupled between the output terminals which has a closed condition caused by the application of a control signal of a first magnitude to cause the output terminals to be short circuited together and has an open circuit condition when the control signal is less than the first magnitude, the control signal being produced by an RC circuit coupled to the variable impedance and to one of the output terminals.

19. A telephone test set in accordance with claim 18 wherein the switching means is a SCR having an anode and cathode coupled respectively to the output terminals and a gate coupled to the RC circuit.

20. A telephone test set in accordance with claim 19 further comprising:
(a) a voltage limiting circuit coupled to the variable impedance and on of the output terminals; and
(b) the gate is coupled to the voltage limiting circuit to protect the gate against excessive voltage.

21. An indicating circuit within a telephone test set for continuously signaling the direction of current flow between tip and ring lines of a telephone line in which the indicating circuit is connected in series with a means for transmitting and receiving voice communications within the test set comprising:
(a) a pair of oppositely poled light emitting diodes for respectively indicating different directions of current flow between the tip and ring lines by emitting light of a different color, the pair of oppositely poled diodes being coupled between one of the lines of the telephone line and the means for transmitting and receiving;
(b) an audio frequency bypass means which shunts the oppositely poled light emitting diodes to permit audio frequencies to bypass the light emitting diodes; and
(c) a resistance which shunts the oppositely poled light emitting diodes to permit conduction of current in the shunt circuit when a voltage across the oppositely poled light emitting diodes is insufficient to bias one of the light emitting diodes substantially into conduction.

22. An indicating circuit in accordance with claim 21 further comprising:
a voltage limiting means which shunts the pair of light emitting diodes to limit the voltage which is applied to the diodes.

23. An indicating circuit in accordance with claim 21 wherein the voltage limiting means comprises a plurality of series connected diodes which shunt the oppositely poled light emitting diodes.

24. A telephone test set comprising:
(a) a first lead and a second lead which are respectively adapted to be connected to a tip line and a ring line of a telephone line;
(b) a shunt circuit coupled between the first lead and the second lead which is comprised of a series connection of means for transmitting and receiving voice communications and a switching means having an open circuit condition when control signal of a first magnitude is applied to a control terminal and having a closed circuit condition when the control signal of a second magnitude is applied to the control terminal to permit current to flow within the shunt circuit;
(c) a signaling means coupled to the first and second leads for producing signals to place a telephone call over the tip and ring lines to a central office when in an activated state and for not producing signals when in an inactive state, the signaling means not being coupled in series within the shunt circuit;
(d) means for providing electrical power to the signaling means; and
(e) control means responsive to the signaling means for producing the control signal having the first magnitude when the signaling means for placing a telephone call is in the active state and having the second magnitude when the signaling means for placing a telephone call is in the inactive state.

25. A telephone test set in accordance with claim 24 wherein the shunt circuit further comprises means for continuously indicating the direction of current flow between the tip and ring lines of the telephone line, and which indicating means is connected series with the means for transmitting and receiving voice communications and the switching means.

* * * * *